United States Patent [19]

Filippova et al.

[11] Patent Number: 5,618,573
[45] Date of Patent: Apr. 8, 1997

[54] PRODUCTION OF VODKA BY SUPERCOOLING TECHNOLOGY

[75] Inventors: Irina V. Filippova; Nadezhda L. Filippova, both of Bethlehem, Pa.

[73] Assignee: RTD Corporation, Bethlehem, Pa.

[21] Appl. No.: 560,818

[22] Filed: Nov. 20, 1995

[51] Int. Cl.⁶ .................. C12G 3/08; C12G 3/04
[52] U.S. Cl. .................. 426/592; 426/330.4; 426/422; 426/490
[58] Field of Search .................. 426/330.4, 422, 426/490, 592

[56] References Cited

U.S. PATENT DOCUMENTS

| 2,946,687 | 7/1960 | Jacobs | 426/422 |
| 3,914,442 | 10/1975 | Servadio et al. | 426/271 |
| 3,930,042 | 12/1975 | Dunnet | 426/475 |
| 4,086,366 | 4/1978 | Antonov et al. | 426/14 |
| 4,877,772 | 10/1989 | Mudzhiri | 514/23 |
| 5,370,891 | 12/1994 | Fillipova | 426/422 |

FOREIGN PATENT DOCUMENTS

| 56-98638 | 1/1983 | Japan . |
| 37972 | 2/1985 | Japan . |
| 734268 | 5/1980 | U.S.S.R. . |
| 2216139 | 10/1989 | United Kingdom . |

*Primary Examiner*—Esther Kepplinger
*Assistant Examiner*—Curtis E. Sherrer

[57] ABSTRACT

A method of treating a mixture of ethyl alcohol and water for the reduction of impurities comprising: contacting the mixture with three layers of activated charcoal having specified surface activities at a temperature of from −45° C. to −22° C., followed by contacting the mixture with three other layers of activated charcoal having specified surface activities at a temperature of from −22° C. to 5° C.

8 Claims, No Drawings

5,618,573

PRODUCTION OF VODKA BY SUPERCOOLING TECHNOLOGY

BACKGROUND OF THE INVENTION

1. Field of the Invention

This invention relates to a process for the treatment of aqueous ethyl alcohol to remove impurities therefrom. More particularly, the invention relates to a process, using supercooling technology, for the treatment of aqueous ethyl alcohol, obtained by fermentation of a cereal, to prevent formation of certain impurities during the process of purification of aqueous ethyl alcohol, and to remove other impurities therefrom while maintain desirable organoleptic qualities in order to provide an improved, high alcoholic content beverage commonly referred to as vodka.

2. Reported Developments

Ethyl alcohol has been known and made since prehistoric times by fermentation of sugars using a yeast which changes the sugars into alcohol and carbon dioxide. The source of sugars is a cereal, such as potato and grain (wheat and corn and the like). The fermentation process is rather complex producing, in addition to ethyl alcohol, other substances including fusel oil, glycerin and various organic acids. The fermented liquid containing about 7 to 12 percent ethyl alcohol, the remaining portion being mostly water, is concentrated by distillation. The process of distillation not only concentrates the ethyl alcohol, but also removes a large portion of the unpleasant-tasting impurities. Repeated purification by distillation to remove most of the unwanted impurities also removes all of the flavoring elements which are necessary in potable liquors. Consequently, in the distillation of potable liquors, the process of removing unwanted impurities is only partially completed in order to save the desired flavoring elements. However, other methods are used to further remove unwanted impurities.

The removal of unwanted impurities is especially important in vodka since it is a pure beverage to which no flavors are added to mask the taste of impurities. It is a smooth, unaged, odorless and colorless mixture of about 40 to 50% alcohol and 50 to 60% water, with an extremely mild flavor.

To further purify vodka from impurities the original distillate is flowed through successive beds of activated charcoal. The charcoal traditionally used is made from hard wood, such as beech, maple, oak and hickory. U.S. Pat. No. 2,946,687 describes the use of a modified, partially activated hard-wood charcoal. While this process has been found to be effective to reduce the various impurities present in the alcohol-water mixture, the bottled vodka was found to have a haze of deposit impairing the appearance of the vodka. The source of this deposit was found to be the charcoal used in the process containing polyvalent calcium and manganese ions. U.S. Pat. No. 3,914,442 seeks to eliminate this problem by treating the charcoal treated alcohol with a highly-crosslinked nuclear sulfonic macroporous polystyrene cationic exchange resin and maintaining the pH of the vodka in the range of 7.2 to 9.

Other approaches to purification include blowing nitrogen gas through the alcohol-water solution. The nitrogen gas is said to become saturated with the vapors of ethyl alcohol and the volatile impurities are then drawn through an adsorbent which removes some of the impurities. U.S. Pat. No. 3,930,042 uses a carbon dioxide-containing gas counter—currently to a stream of alcohol in an amount sufficient to provide an alcohol-water mixture having a pH of between 4.0 to 5.5 to reduce impurities and to provide a stable vodka.

U.S. Pat. No. 5,370,891 discloses a method for reducing impurities in vodka by using a low processing temperature of between 5° C. to 20° C. and flowing the vodka through three successive layers of activated charcoal.

While these and other similar approaches to reduce impurities were at least partially successful in producing a popular beverage generally known as Russian vodka, the need still exists to produce vodka more economically which has less impurities, possess excellent organoleptic properties and increased shelf-life.

SUMMARY OF THE INVENTION

In accordance with the present invention, there is provided a method of treating a mixture of ethyl alcohol and water to reduce the formation of certain undesirable impurities during the process of purifying the mixture of ethyl alcohol and water and to reduce the presence of other impurities contained in the mixture of ethyl alcohol and water produced as byproducts of the fermentation process of sugar-containing natural raw material, such as a cereal. The word "impurities" used herein denotes impurities contained in the mixture of alcohol and water as the mixture is obtained as the distillation product of the fermented raw material and to also denote the impurities generated during the subsequent purification treatment of the present invention. Accordingly, the present invention provides a method of treating a mixture of ethyl alcohol and water to reduce impurities contained therein comprising first and second treatment steps, said first treatment step comprising:

(a) mixing of from about 65% v/v to about 75% v/v of ethyl alcohol and of from about 25% v/v to about 35% v/v of purified water (deionized water), preferably about 70% v/v of ethyl alcohol and 30% v/v of purified water and supercooling, while mixing, to a temperature of from about −45° C. to about −22° C. to obtain a homogeneous solution;

flowing the solution through three layers of activated charcoal adsorber at a temperature of from about −45° C. to about −22° C., said activated charcoal adsorber having surface activities of (1) from about 2.0 to about 3.0 mg-equivalent/liter;

(2) from about 3.0 to about 4.0 mg-equivalent/liter; and (3) from about 4.0 to about 5.4 mg-equivalent/liter, said activated charcoal adsorber having a total pore volume of at least of from about 0.9 to about 1.5 cm$^3$/g; and allowing the solution to contact the activated charcoal adsorber for about 0.5 to 5 minutes, preferably for about 1 to 2 minutes;

and said second treatment step comprising:

b) mixing the ethyl alcohol water solution obtained at the end of said first step with purified (deionized) water to obtain an ethyl alcohol water solution containing of from about 35% v/v to about 45% v/v of ethyl alcohol and of from about 55% v/v to about 65% v/v of purified (deionized) water at a temperature of from about −22° C. to about 5° C. to obtain a homogenous solution;

flowing the solution through three layers of activated charcoal adsorber at a temperature of from about −22° C. to about 5° C., said activated charcoal adsorber having surface activities of (4) from about 1.2 to about 1.8 mg-equivalent/liter;

(5) from about 1.8 to about 2.2 mg-equivalent/liter; and (6) from about 2.2 to about 2.6 mg-equivalent/liter, said activated charcoal adsorber having a total pore volume of at least of from about 0.5 to about 0.7 cm³/g; and allowing the solution to contact the activated charcoal adsorber for about 0.5 to 10 minutes, preferably for about 1 to 5 minutes, and most preferably for about 1 to 3 minutes to obtain a purified ethyl alcohol water solution; and collecting the purified ethyl alcohol water solution for storage.

The total pore volume of the activated charcoal adsorber used in the second step treatment process preferably should comprise: a micropore volume of from about 0.1 to about 0.15 cm³/g; a mesopore volume of from about 0.1 to about 0.2 cm³/g; and a macropore volume of from about 0.2 to about 0.3 cm³/g.

The initial capacity of the activated charcoal adsorber is recovered by flowing a stream of dry air, having a temperature of from about 100° C. to about 400° C., through the activated charcoal adsorber.

DETAILED DESCRIPTION OF THE INVENTION

Vodka is a food product widely consumed throughout the world. Its quality, determined by organoleptic and physio-chemical properties, therefore, is important. The basic technology of vodka production was developed in the last century with only minor changes introduced in more recent times.

The present invention addresses the provision of desirable properties in vodka by utilizing the process steps described in the Summary of the Invention and as further referred to as the description of the invention proceeds.

The invention is based on the use of process temperatures in the range of −45° C. to −22° C. in the first of the two step process and in the range of −22° C. to 5° C. in the second of the two step process. The system of ethyl alcohol-water mixtures are rather complex due to the interactions between the ethyl alcohol and water molecules. A variety of changes of properties take place in the mixtures depending of the relative ratios of ethyl alcohol and water molecules and the temperature at which the mixtures are processed.

Water ($H_2O$) can be referred to as an associative liquid wherein the water molecules from the following associations

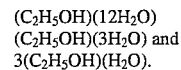

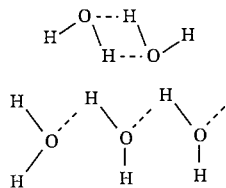

Ethyl alcohol ($CH_3$—$CH_2$—$OH$) is also an associative liquid wherein the ethyl alcohol molecules form the following association

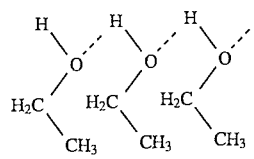

Due largely to structural similarity, ethyl alcohol is miscible with water in any proportions. Ethyl alcohol freezes at −117° C. while water freezes at 0° C. Mixture of ethyl alcohol and water, depending on mixing ratios, have freezing points higher than −117° C. and lower than 0° C. as shown in Table I.

TABLE I

Freezing Temperature, °C., of Water-Ethyl Alcohol Mixtures vs. Volume of Ethyl Alcohol Concentration

| Temperature, °C. | Concentration of Ethyl Alcohol, % Vol. |
|---|---|
| 0 | 2 |
| −10 | 20 |
| −20 | 36 |
| −30 | 50 |
| −40 | 60 |
| −50 | 70 |
| −60 | 79 |
| −70 | 88 |
| −80 | 96 |
| −90 | — |

Mixtures of ethyl alcohol and water form associations and hydrates comprising:

($C_2H_5OH$)(12$H_2O$)
($C_2H_5OH$)(3$H_2O$) and
3($C_2H_5OH$)($H_2O$).

The molecular size of ethyl alcohol is greater than the molecular size of water. In mixtures of ethyl alcohol and water the ethyl alcohol molecules destroy the structure of molecular associations of water at higher temperatures, while at lower temperatures and low concentrations of ethyl alcohol in the mixture, the molecular structure of water is essentially conserved. Thermodynamic properties of ethyl alcohol-water mixtures, such as entropy of mixing, the free or liberated energy of mixing and the excess isobaric heat capacities of mixing, reflect an increasing net disruption of hydrogen bonds with increasing temperatures. The heat of mixing, together with the external temperature conditions under which mixing is done, are associated with the formation of undesirable chemical compounds referred to heroin as clathrates. In the formation of clathrate compounds, ethyl alcohol molecules enter into the spaces of the molecular structure of water. The clathrates formed by ethyl alcohol and water behave similarly to compounds known in the art as clathrates which am capable of trapping other substances within their own crystal lattices: the cavities of the host molecules, referred to as cages, tunnels or layers, entrap guest molecules of approximately the same size and shape rather than by chemical similarity with the host molecules. While applicants do not intend to rely on theories in explaining the theoretical aspects of their invention, they believe that the clathrate compounds formed during the mixing of ethyl alcohol and water at higher temperatures also trap undesirable and unpleasant-tasting compounds, such as acetals and hemiacetates. Once trapped in the cavities of the clathrates these undesirable compounds are difficult to remove during the process of purification using activated charcoal. It is, accordingly, necessary to mix, and subsequently purify, ethyl alcohol and water mixtures at low temperatures.

The present invention uses a superlow temperature of from −45° C. to −22° C. in the first treatment step, and of from −22° C. to 5° C. in the second treatment step to minimize the formation of unpleasant-tasting compounds, such as acetals and hemiacetals. The ingredients necessary for the formation of these undesirable compounds are present in small amounts in the alcohol-water mixture. The treatment steps involve the purification of the alcohol-water mixture over activated charcoal herein described. It is to be noted that the surface activities of activated charcoal increases about 2.5 to 5.5-fold at these lower temperatures, therefore, efficiency of the purification process of the ethanol-water solution at these low temperatures greatly increases.

In addition to the superlow temperatures the present invention uses specific activated charcoals and precise contact times in order to produce the highly purified ethyl alcohol-water mixture further description of which follows.

First Treatment Step

After mixing ethyl alcohol and water in the first treatment step, the solution is flowed through three successive layers of activated charcoal adsorber in order to adsorb impurities at a temperature of from about −45° C. to about −22° C.

The grain of activated charcoal typically have an effective interior surface area of about 50 to 150 cm$^2$/g and an external surface area of about 10 to 20 cm$^2$/g. The interior surface area is, accordingly, $2 \times 10^4$ to $15 \times 10^4$ times greater than the external surface area. The pore size of the activated charcoal is typically about 0.5 to 1.5 nm, while the molecular size of impurities ranges from about 0.3 to about 1.0 nm. Therefore, the molecules of impurities can penetrate into the pores of the activated charcoal and be adsorbed onto the large interior surface thereof. The surface activity is influenced by: (a) the charcoal's temperature and (b) the amount of base oxides present on the surface of the activated charcoal. We have found that in the practice of the present invention, three successive layers of activated charcoal adsorber having low, middle and high activities work best. The low surface activity should be in the range of from about 2 to 3 mg-equivalent/liter, the middle one should be of from about 3 to 4 mg-equivalent/liter, while the high surface activity charcoal should have a range of from about 4 to 5.4 mg-equivalent/liter. The solution is flowed from the low activity layer, through the middle layer having medium activity then through the top, highest activity charcoal at a temperature of from about −45° C. to about −22° C.

For efficient treatment, the activated charcoal should have a total pore volume of from about 0.9 to about 1.5 cm$^3$/g and a pore distribution volume of from about 0.2 to about 0.3 cm$^3$/g micropore; from about 0.2 to about 0.4 cm$^3$/g mesopore, and from about 0.4 to about 0.9 cm$^3$/g macropore. As used herein, micropore means a pore size of less than 2 nm; mesopore means a pore size of about 2 to 50 nm; and macropore means a pore size of greater than 50 nm.

Second Treatment Step

After mixing for the second treatment step, the solution is flowed through three successive layers of activated charcoal adsorber in order to adsorb impurities at a temperature of from about −22° C. to about 5° C. The low surface activity of the charcoal adsorber should be in the range of from about 1.2 to 1.8 mg-equivalent/liter for the first layer, the middle one should be of from about 1.8 to 2.2 mg-equivalent/liter, while the high surface activity charcoal should be in the range of from about 2.2 to 2.6 mg-equivalent/liter. The solution is flowed: through the first layer having low activity, through the middle layer; then through the highest activity charcoal layer at a temperature of from about −22° C. to about 5° C.

For efficient treatment, the activated charcoal should have a total pore volume of from about 0.5 to about 0.7 cm$^3$/g of charcoal and a pore distribution volume of from about 0.1 to about 0.15 cm$^3$/g micropore, of from about 0.1 to about 2.0 cm$^3$/g mesopore, and from about 0.2 to about 0.3 cm$^3$/g macropore. Again, as used herein, micropore means a pore size of less than 2 nm; mesopore means a pore size of about 2 to 50 nm; and macropore means a pore size of greater than 50 nm.

The Activated Charcoal

Properties of activated charcoal are described, for example by: (1) R. C. Bansal, J. B. Donnet and F. Stoeckli, "Active Carbon", Marcell Dekker, Inc., New York, N.Y. (1988); (2) J. W. Patrick, "Porosity in Carbons: Characterization and Applications", Halsted Press, New York, N.Y. (1995); and (3) A. W. Adamson, "Physical Chemistry of Surfaces", Interscience, New York, N.Y. (1986).

The present invention takes advantage of the fact that the activity of activated charcoal increases with decreasing temperature. According to the Arrhenius equation 1 (see reference 3), the activity of charcoal, $A_{charcoal}$ increases with decreasing temperature, T, i.e., $$A_{charcoal}(T) = A_o \exp.(-E_a/RT) \text{ wherein}$$

$A_o$ is the pre-exponential factor;
$E_a$ is the activation energy of adsorption;
R is the gas constant; and
T is the absolute temperature in units of Kelvin (°K).

According to the experimental data and the Arrhenius equation 1, the activity of charcoal increases from about 1.5 at a temperature of 5° C. to about a temperature of −45° C.

Activated charcoal adsorbers are available from industrial manufacturers, such as: Envirotrol., Inc., Sewickley, Pa.; AFL Industries, Inc., Riviera Beach, Fla.; Norit Americas, Inc., Atlanta, Ga.; Activated Carbon Resources, Ridgefield, Conn.; Carbon Activated Ltd., Gardena, Calif.; General Carbon Corp., Paterson, N.J.; North American Carbon, Inc., Columbus, Ohio.

Contact Time

In the first treatment step the optimum contact time between the solution of ethyl alcohol and water and the activated charcoal at a superlow temperature of from about −45° C. to about −22° C., was found to be of from 0.5 to about 5 minutes, and preferable of from about 1 to about 2 minutes. This parameter is rather surprising when compared to the contact time used by the vodka industry, namely of about 100 minutes or more.

If the contact time is less than about 0.5 to 5 minutes, the amount of impurities adsorbed onto the activated charcoal is less than adequate to obtain a vodka product with good organoleptic qualities. If, on the other hand, the contact time is longer than 5 minutes, the catalytic process taking place between the activated charcoal and the solution results in the generation of aldehydes, ketones and other unwanted impurities, again decreasing the organoleptic index of the vodka.

In the second treatment step the optimum contact time between the solution and the activated charcoal at a low temperature of from about −22° C. to about 5° C., was found to be of from 1 to about 10 minutes, preferable of from about 1 to 5 minutes, and most preferably of from about 1 to 3 minutes. If the contact time is less than about 1 to 3 minutes, the amount of impurities adsorbed onto the activated charcoal is less than sufficient to obtain a vodka product with good organoleptic qualities. If, on the other hand, the contact time is longer than 5 to 10 minutes, the catalytic process taking place between the activated charcoal and the solution results in the generation of aldehydes, ketones and other unwanted impurities, again decreasing the organoleptic index of the vodka.

Reactivation of Charcoal After Use

We have also found that the activated charcoal can be treated to regain nearly all its initial adsorbent capacity by using the simple step of blowing dry heated air through the layers of activated charcoal from the top lowest surface activity bed to the bottom highest surface activity bed at a temperature of from about 100° C. to 400° C. Each layer of charcoal (low, middle and high surface activity) were found to be regenerated by this process ready for successive uses.

Supercooling

The required temperatures of from about −45° C. to −22° C. to 5° C. can be achieved and maintained during the mixing and treatment steps by art-recognized methods, such as by the use of liquid nitrogen via cooling jackets, and coils, or by the use of dry ice. Techniques of supercooling are described, for example by: G. Walker, "Cryocooler. Part 1: Fundamentals; Part 2: Application", Plenum Press, New York, N.Y. (1988) and F. Din and A. H. Cockett, "Low-Temperature Techniques", George Newness Limited, London (1989).

The following examples will further illustrate the present invention. Example 1 utilizes the process according to the present invention. Example 2 is a comparative example utilizing a process used by the prior art.

EXAMPLE 1

73–74% v/v of grain alcohol containing 95–96% v/v ethanol was mixed with 26–27% v/v of demineralized water to form a solution and cooled to a temperature of from about −45° C. to about −22° C. For the first treatment step, the solution was flowed up through the three layers of activated charcoal having low, medium and high surface activity at a superlow temperature of from about −45° C. to about −22° C. Duration of contact time was about 1.5 minutes. For the second treatment step, the solution was mixed with demineralized water to form a solution of 40% v/v ethanol and 60% v/v water at a low temperature of from about −22° C. to about 5° C. The solution was then flowed up through three layers of activated charcoal having low, medium and high surface activity at a superlow temperature of from about −22° C. to about 5° C. Duration of contact time was about 3.5 minutes. The mixture then was filtered to remove suspended solid particles of the activated charcoal at a temperature of from about 5° C. to 20° C.

Several batches of the product were made and their pH's were measured. The average pH at 22° C. was from 7.1 to 7.5.

EXAMPLE 2 (Comparative Example)

41.8–42.2% v/v of grain alcohol containing 95–96% v/v ethanol was kept at a temperature of between 20° C. to 25° C. and mixed with 57.8–58.2% v/v of demineralized water to form a solution. The solution was flowed through three columns linked in series containing activated granular charcoal at a temperature of between 20° C. to 25° C. Duration of contact time was about 90 minutes. The solution was filtered to remove suspended solid impurities.

EXAMPLE 3 (Comparative Example)

The same procedure and the same quantity of mixes were used as in Example 2, except the mixing and charcoal treatment were carried out at a temperature of between 5° C. to 10° C.

Samples of the product of Examples 1 and comparative Examples 2 and 3 were analyzed chromatographically based on the procedure described in Journal of Chromatography, 198 (1980) 347–353. The results obtained are shown in Table II wherein:

column I denotes mg/liter of impurities in the grain alcohol prior to mixing, i.e. the grain alcohol used in Examples 1, 2 and 3 as the starting material;

column IIA and IIB denote mg/liter impurities of the alcohol-water solution formed at 20° C. to 25° C. (Example 2) and at 5° C. to 10° C. (Example 3), respectively;

column IIIA and IIIB denote mg/liter of impurities after flowing the alcohol-water solution through activated charcoal at temperatures of 20° C. to 25° C. (Example 2) and 5° C. to 10° C. (Example 3), respectively; and column IV denotes mg/liter impurities of the product prepared in Example 1, i.e., after the first and second treatment steps of the alcohol-water mixture at the superlow temperatures of −45° C. to −22° C. and of −22° C. to 5° C.

TABLE II

| | Impurities Content | | | | | |
| --- | --- | --- | --- | --- | --- | --- |
| | Temperature | | | | | |
| | (20° C.–25° C.) | | | 5° C.–10° C. | | −45° C.–−22° C./−22° C.–5° C. |
| Impurities | I | IIA | IIIA | IIB | IIIB | IV |
| Methylethyl ether | 0.1 | 0.0 | 0.0 | 0.005 | 0.0 | 0.0 |
| Diethyl ether | 0.3 | 0.1 | 0.4 | 0.1 | 0.0 | 0.0 |
| Methylformate | 0.0 | 0.0 | 5.0 | 0.0 | 0.0 | 0.0 |
| Carbonic Acid | 0.3 | 0.9 | 0.0 | 0.1 | 0.0 | 0.0 |
| Ethylpropyl ether | 1.9 | 0.0 | 3.8 | 0.75 | 0.0 | 0.0 |
| Acetaldehyde | 7.9 | 8.0 | 15.6 | 3.0 | 1.0 | 0.1 |
| Propionaldehyde | 5.4 | 5.0 | 0.0 | 2.0 | 0.0 | 0.0 |
| Ethylformate | 3.2 | 0.0 | 0.0 | 1.5 | 0.0 | 0.0 |
| Methylacetate | 12.3 | 0.0 | 0.0 | 5.0 | 0.0 | 0.0 |
| Acetone | 0.0 | 0.0 | 0.0 | 0.0 | 0.0 | 0.0 |
| Ethylacetate | 7.4 | 10.2 | 17.7 | 3.0 | 0.0 | 0.0 |
| Propylformate | 0.7 | 0.0 | 0.0 | 0.3 | 1.0 | 0.0 |
| Methylpropionate | 0.2 | 0.0 | 3.0 | 0.005 | 1.0 | 0.2 |
| Ethylpropionate | 0.2 | 0.0 | 0.0 | 0.005 | 1.0 | 0.2 |
| Propylacetate | 0.4 | 2.3 | 0.0 | 0.1 | 0.0 | 0.0 |
| Methanol | 20.1 | 10.5 | 8.0 | 8.0 | 1.0 | 0.1 |

The sources of ethyl alcohol used in the process of the present invention include any carbohydrate containing material which by fermentation produces ethyl alcohol, such as grain, potato and beet.

While the present invention has been described as drawn to a process of making vodka, the invention may be used to advantage in making other alcoholic beverages since the purification process reduces/eliminates unwanted impurities from mixtures of ethyl alcohol and water. Following the purification process the alcoholic beverages can be modified by flavoring and coloring substances to produce the desired organoleptic qualities and appearance.

As various changes might be made in the process of the invention herein disclosed, without departing from the spirit and principles of the invention, it is understood that all matter herein described shall be deemed illustrative, and not limiting except as set forth in the appended claims.

What is claimed is:

1. A method of treating a mixture of ethyl alcohol and water to reduce impurities contained therein consisting first and second treatment steps, wherein said first treatment step comprises:

a) mixing of from about 65% to about 75% v/v of ethyl alcohol and of from about 25% v/v to about 35% v/v of water to obtain a solution at a superlow temperature of from about −45° C. to about −22° C.;

flowing the solution through three layers of an activated charcoal adsorber at a temperature of from about −45°

C. to about −22° C., said activated charcoal adsorber layers having surface activities of
1) from about 2.0 to about 3.0 mg-equivalent/liter,
2) from about 3.0 to about 4.0 mg-equivalent/liter, and
3) from about 4.0 to about 5.4 mg-equivalent/liter;
said activated charcoal adsorber having a total pore volume of from about 0.9 to about 1.5 cm$^3$/g;
allowing the solution to contact the activated charcoal adsorber for about 0.5 to 5 minutes;
wherein said second treatment step comprises:
b) mixing the ethyl alcohol-water solution obtained in said first treatment step with water to obtain an ethyl alcohol-water solution containing of from about 35% v/v to about 45% v/v of ethyl alcohol and of from about 55% v/v to about 65% v/v of water at a temperature of from about −22° C. to about 5° C.;
flowing the solution through three layers of an activated charcoal adsorber at a temperature of from about −22° C. to about 5° C., said activated charcoal adsorber layers having surface activities of
4) from about 1.2 to about 1.8 mg-equivalent/liter,
5) from about 1.8 to about 2.2 mg-equivalent/liter, and
6) from about 2.2 to about 2.6 mg-equivalent/liter;
said activated charcoal adsorber having a total pore volume of from about 0.5 to about 0.7 cm$^3$/g;
allowing the solution to contact the activated charcoal adsorber for about 0.5 to 10 minutes; and
collecting the purified ethyl alcohol-water solution.

2. The method of claim 1 wherein the total pore volume of the activated charcoal adsorber layers used in the second step treatment comprises:
a micropore volume of from about 0.1 to about 0.15 cm$^3$/g;
a mesopore volume of from about 0.1 to about 0.2 cm$^3$/g; and
a macropore volume of from about 0.2 to about 0.3 cm$^3$/g.

3. The method of claim 1 further comprising the step of filtering the purified alcohol-water solution to remove activated charcoal particles therefrom.

4. The method of claim 1 further comprising the step of recovering the initial capacity of the activated charcoal adsorber by flowing a stream of dry air having a temperature of from about 100° C. to about 400° C. through the activated charcoal adsorber layers.

5. A method of treating a mixture of ethyl alcohol and water to reduce impurities contained therein consisting first and second treatment steps, wherein said first treatment step comprises:

a) mixing about 70% v/v of ethyl alcohol and about 30% v/v of water to obtain a solution at a superlow temperature of from about −45° C. to about −22° C.;
flowing the solution through three layers of an activated charcoal adsorber at a temperature of from about −45° C. to about −22° C., said activated charcoal adsorber layers having surface activities of
1) from about 2.0 to about 3.0 mg-equivalent/liter,
2) from about 3.0 to about 4.0 mg-equivalent/liter, and
3) from about 4.0 to about 5.4 mg-equivalent/liter;
said activated charcoal adsorber having a total pore volume of from about 0.9 to about 1.5 cm$^3$/g;
allowing the solution to contact the activated charcoal adsorber for about 1 to 2 minutes;
wherein said second treatment step comprises:
b) mixing the ethyl alcohol-water solution obtained in said first treatment step with water to obtain an ethyl alcohol-water solution containing about 40% v/v of ethyl alcohol and about 60% v/v of water at a temperature of from about −22° C. to about 5° C.;
flowing the solution through three layers of an activated charcoal adsorber at a temperature of from about −22° C. to about 5° C., said activated charcoal adsorber layers having surface activities of
4) from about 1.2 to about 1.8 mg-equivalent/liter,
5) from about 1.8 to about 2.2 mg-equivalent/liter, and
6) from about 2.2 to about 2.6 mg-equivalent/liter;
said activated charcoal adsorber having a total pore volume of from about (0.5 to about 0.7 cm$^3$/g;
allowing the solution to contact the activated charcoal adsorber for about 1 to 3 minutes; and
collecting the purified ethyl alcohol-water solution.

6. The method of claim 5 wherein the total pore volume of the activated charcoal adsorber layers used in the second step treatment comprises:
a micropore volume of from about 0.1 to about 0.15 cm$^3$/g;
a mesopore volume of from about 0.1 to about 0.2 cm$^3$/g; and
a macropore volume of from about 0.2 to about 0.3 cm$^3$/g.

7. The method of claim 5 further comprising the step of filtering the purified alcohol-water solution to remove activated charcoal particles therefrom.

8. The method of claim 5 further comprising the step of recovering the initial capacity of the activated charcoal adsorber by flowing a stream of dry air having a temperature of from about 100° C. to about 400° C. through the activated charcoal adsorber layers.

* * * * *